US009102369B2

(12) United States Patent
Urakami

(10) Patent No.: US 9,102,369 B2
(45) Date of Patent: Aug. 11, 2015

(54) TRAVELLING DEVICE EQUIPPED WITH DUAL, ROTATING, NEGATIVE-PRESSURE SUCTION SEALS

(75) Inventor: Fukashi Urakami, Kanagawa (JP)

(73) Assignee: URAKAMI LLC, Kanagawa (JP)

( * ) Notice: Subject to any disclaimer, the term of this patent is extended or adjusted under 35 U.S.C. 154(b) by 0 days.

(21) Appl. No.: 13/980,096

(22) PCT Filed: Jan. 14, 2012

(86) PCT No.: PCT/JP2012/050643
§ 371 (c)(1),
(2), (4) Date: Sep. 20, 2013

(87) PCT Pub. No.: WO2012/099028
PCT Pub. Date: Jul. 26, 2012

(65) Prior Publication Data
US 2014/0014430 A1  Jan. 16, 2014

(30) Foreign Application Priority Data

Jan. 17, 2011  (JP) ................................. 2010-006532

(51) Int. Cl.
*B62D 57/024* (2006.01)
*B62D 57/00* (2006.01)

(52) U.S. Cl.
CPC .............. *B62D 57/024* (2013.01); *B62D 57/00* (2013.01)

(58) Field of Classification Search
CPC ..... B62D 57/024; B62D 57/00; Y10S 901/01
USPC ...................... 180/8.1, 8.3, 8.5, 8.6, 164, 901
See application file for complete search history.

(56) References Cited

U.S. PATENT DOCUMENTS 4,785,902 A * 11/1988 Ochiai .......................... 180/164
5,161,631 A * 11/1992 Urakami ...................... 180/164

FOREIGN PATENT DOCUMENTS

| JP | 63-195072 A | 8/1988 |
| JP | 06-071378 U | 10/1994 |
| JP | 2689127 B2 | 12/1997 |
| JP | 2805614 B2 | 9/1998 |

* cited by examiner

*Primary Examiner* — Joseph Rocca
*Assistant Examiner* — Jacob Knutson
(74) *Attorney, Agent, or Firm* — Kubotera & Associates, LLC

(57) ABSTRACT

To improve the traveling functionality of a traveling device equipped with dual, rotating, negative-pressure suction seals. Provided is a traveling device equipped with dual, rotating, negative-pressure suction seals, which is characterized in that: a single, rotating, negative-pressure suction seal is respectively provided to the left and the right of the axis of travel of the traveling device; the distance between the rotational axis of one of the negative-pressure suction seals and the axis of travel is substantially equal to the distance between the rotational axis of the other negative-pressure suction seal and the axis of travel; the outer peripheral shape of each negative-pressure suction seal forms a shape comprising a farthest outer peripheral end portion, which is the outer peripheral end portion farthest from the rotational axis, and a nearest outer peripheral end portion, which is the outer peripheral end portion nearest to the rotational axis; and a driven wheel is provided inside each negative-pressure suction seal.

9 Claims, 11 Drawing Sheets

TRAVELLING DEVICE EQUIPPED WITH DUAL, ROTATING, NEGATIVE-PRESSURE SUCTION SEALS

TECHNICAL FIELD

This invention relates to a device capable of adhering to and moving along the surface of various kinds of object, such as steel structures like ship hulls, oil tanks, bridges, and pipes, or concrete structures like buildings, water tanks, and roads, or structures of floor made from a material like resin, wood, and a fiber.

Such a device being equipped with dual, rotating, negative-pressure suction seals, the device removes foreign substances, such as dirt, rust, old coating, or aquatic organisms adhering to the surface of the various kinds of object, and the device also carries out suction recovery of the removed foreign substance.

BACKGROUND ART

As this kind of well-known technology, the "Device capable of suction-adhering to a surface and moving therealong" disclosed in the Japanese patent No. 2689127 and the "Device capable of suction-adhering to a surface and moving therealong" disclosed in the Japanese patent No. 2805614 are known. These patents were invented by the inventor of the present invention.

The Device comprises the main casing, the wheels secured to the main casing as a means for mobility, the negative-pressure suction seal connected to the main casing having the peripheral end portion which is caused to contact the surface of an object, the negative-pressure suction seal which rotates the axis of rotation perpendicular to the object surface as an axis, the negative pressure forming means to discharge externally the liquid contained in the negative pressure area defined by the main casing, the surface and the negative-pressure suction seal, and the vacuum breaker which makes envelopment fluid flow into the inside of the negative pressure area and maintains the pressure of the area to the predetermined vacuum pressure.

That is, the vacuum breaker is a kind of the relief valve for maintaining vacuum pressure to a fixed degree of vacuum.

The main casing must not necessarily be directly equipped with the relief valve. In the suction hose which connects the main casing, and a negative pressure generation means, the portion close to the main casing of the suction hose may be equipped with the relief valve.

In such a device, the energization of the negative pressure forming means causes the liquid inside the said area to be discharged externally, and the pressure of the liquid that acts on the main casing because of the liquid pressure difference between the inside and the outside of the said area is transmitted to the surface of an object via the wheels, such liquid pressure allowing the Device to adhere to the surface. Additionally, the rotation of the wheels by way of a driving means, such as an electric motor, during such adhesion state allows the Device to move along the surface by the action of the wheels.

Further, if the negative-pressure suction seal in which it was equipped with polish components, such as abrasive cloth, is rotated, polish cleaning of the object surface can be carried out.

And suction recovery of the particulates generated in the case of the polish cleaning work is altogether carried out by the action of the negative pressure generation means. In this device, various cleaning on the object surface can be performed safely and efficiently by remote control, without generating particulates.

[Patent Reference 1]
Japan Patent No. 2689127
[Patent Reference 2]
Japan Patent No. 2805614

In order to use the "Device capable of suction-adhering to a surface and moving therealong" disclosed in Japan Patent No. 2689127 and Japan Patent No. 2805614, there are following problems to be solved.

"Device capable of suction-adhering to a surface and moving therealong" is equipped with the negative-pressure regulating means so that the contact pressure of the surface and the negative-pressure suction seal may be maintained by the small value.

However, when the negative-pressure regulating means is not efficient, the torque of the seal to be rotated is increased by increasing of the friction between the surface and the seal. The reaction of the torque of the seal tends to make the device to rotate. Therefore, it is difficult for the device to travel straight.

Accordingly, the subject of the present invention is offering "Traveling device equipped with dual, rotating, negative-pressure suction seals" which is equipped with the means by which the straight travel function of the device is not obstructed when the device travels along the surface of the structures.

DISCLOSURE OF THE INVENTION

In order to solve the technical problems described above, provided is the device, comprising: the traveling device equipped with dual, rotating, negative-pressure suction seals, wherein: the traveling axis line which it is parallel to the traveling direction of the traveling device, and is also the central axis line of the traveling device; the rotating negative-pressure suction seals arranged toward the traveling direction at the right and left of the traveling axis line; the distance of the traveling axis line and the rotation axis line of one negative-pressure suction seal is equal to the distance of the traveling axis line and the rotation axis line of another negative-pressure suction seal; the furthest perimeter part from the rotation axis and the nearest perimeter part from the rotation axis are formed in each negative-pressure suction seal; the inside of each negative-pressure suction seals is equipped with the wheel to drive.

In order to solve the technical problems described above, provided is the device, comprising: the traveling device equipped with dual, rotating, negative-pressure suction seals described in Claims 1, wherein: the dual, rotating, negative-pressure suction seals synchronize and rotate; the rotating of the dual negative-pressure suction seals is constituted so that the distance of the nearest perimeter part of one seal and the traveling axis line may become the maximum when the distance of the furthest perimeter part of another seal and the traveling axis line is the maximum.

In order to solve the technical problems described above, provided is the device, comprising: the traveling device equipped with dual, rotating, negative-pressure suction seals, wherein: the dual, rotating, negative-pressure suction seals have the opposite direction of rotation.

In order to solve the technical problems described above, provided is the device, comprising: the traveling device equipped with dual, rotating, negative-pressure suction seals, wherein: the dual, rotating, negative-pressure suction seals have the same direction of rotation.

In order to solve the technical problems described above, provided is the device, comprising: the traveling device equipped with dual, rotating, negative-pressure suction seals, wherein: each negative-pressure suction seal is equipped with the drive wheel of one formula inside of the seal and is equipped with the drive wheel outside of the seal of at least 1 formula which rotates in the direction synchronizing with the internal drive wheel.

In order to solve the technical problems described above, provided is the device, comprising: the traveling device equipped with dual, rotating, negative-pressure suction seals, wherein: each negative-pressure suction seal is equipped with the drive wheel of one formula inside of the seal and is equipped with the free wheel outside of the seal of at least 1 formula which rotates freely.

In order to solve the technical problems described above, provided is the device, comprising: the traveling device equipped with dual, rotating, negative-pressure suction seals, wherein: the drive wheel is arranged in the position which kept away from the external drive wheel or the external free wheel as much as possible.

In order to solve the technical problems described above, provided is the device, comprising: the traveling device equipped with dual, rotating, negative-pressure suction seals, wherein: each negative-pressure suction seal is equipped with two or more drive wheels inside of the seal.

Effects of the present invention will be explained below. In reference to the effects of the device, being caused by that the rotating negative-pressure suction seals arranged toward the traveling direction at the right and left of the traveling axis line and that the inside of each negative-pressure suction seals is equipped with the wheel to drive; even if each seal rotates, the reaction does not affect the whole device. That is, even if each seal rotates, the power in which it rotates the whole device does not occur at all. Accordingly, the straight travel function of the device is not obstructed when the device travels along the surface of the structures.

In reference to the effects of the device, being caused by that the distance of the traveling axis line and the rotation axis line of one negative-pressure suction seal is equal to the distance of the traveling axis line and the rotation axis line of another negative-pressure suction seal, and that the furthest perimeter part from the rotation axis and the nearest perimeter part from the rotation axis are formed in each negative-pressure suction seal; two seals, left-hand side and right-hand side, perform the contact action to all of the fields on the surface between one seal and another seal. Therefore, "cleaning unevenness" does not occur.

In reference to the effects of the device, being caused by that the inside of each negative-pressure suction seals is equipped with the wheel to drive; in the contrast of a size with the seal and the drive wheel, the seal is small as much as possible, and it can manufacture the drive wheel as large as possible. Therefore, lightweight and small device becomes realizable. Furthermore, since the device possesses the large drive wheel even if the big projection of a weld line etc. exists in the surface, the device can overcome the projection easily.

The center of gravity of the adhering power which acts on the seal exists in each seal. In reference to the effects of the device, being caused by that the seals have the opposite direction of rotation; in the rotation phase of each seal, even if each seal is in any phase, the position of the center of gravity of two adhering power will be in the state where balance is maintained mutually. Therefore, the stable traveling and adhering is possible for the device.

In reference to the effects of the device being caused by that the drive wheel is arranged in the position which kept away from the external drive wheel or the external free wheel as much as possible, the stable traveling and adhering is possible for the device.

DESCRIPTIONS OF THE PREFERRED EMBODIMENTS

Preferred embodiments of the Device configured according to the present invention will be described in detail below, referring to the figures attached hereto.

Figure 1:
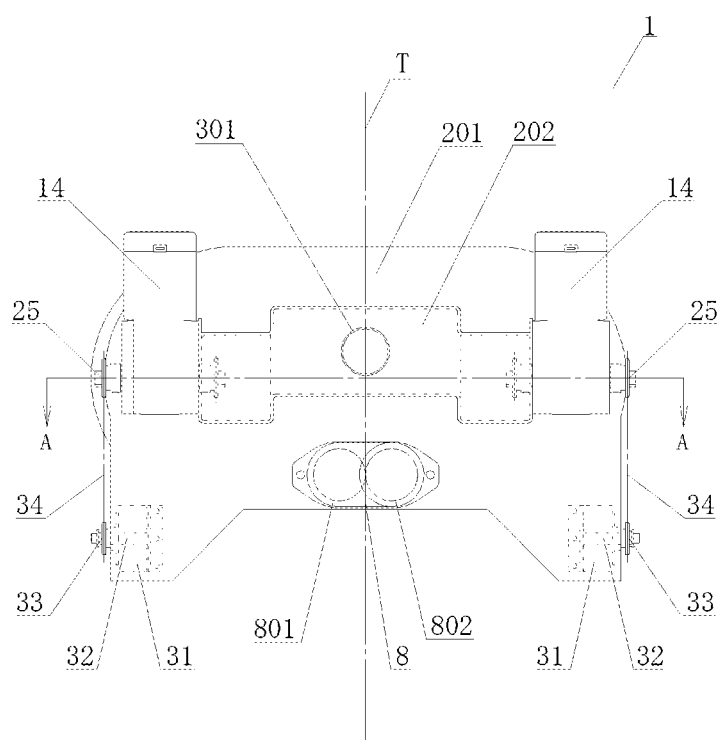
FIG. 1 is a to view of the first preferred embodiment of the device configured according to the present invention.

FIG. 1 is a top view of a preferred embodiment of the device configured according to the present invention that is seen from the position away from the surface of an object. FIG. 1 shows that the device adheres to the wall surface by suction.

In FIG. 1, the device travels along the surface by setting a central axis as the axis line T. That is, the device goes up and descends, and circles to a clockwise rotation, or circles to a counterclockwise rotation.

About the name of the component which constitutes the device, hereafter, a left-hand side portion is called the left bordering on the axis line T, and a right-hand side portion is called the right.

Explained below referring to FIG. 1 through FIG. 7 the preferred embodiment of the device. The device illustrated therein has a main casing. The main casing has constituted form symmetrical as a central axis for the axis line T, and is made of a rigid material, comprising;

the main member 201 of which shape is plate-like, and is formed two pieces of the square-shaped openings 205 in the symmetrical position centering on the axis line T; each of the square-shaped openings 205 stores the drive wheel 11 of one right and left each;

the left fixed cylindrical member 203 which surrounds the left square-shaped opening 205 and is welded to the main member 201;

the right fixed cylindrical member 204 which surrounds the right square-shaped opening 205 and is welded to the main member 201;

the square-box-shaped member 202 which connects two openings 205 and is welded to the main member 201;

the suction hose connector 301 which is welded to the square-box-shaped member 202. The suction hose connector 301 is connected to a negative pressure generation means (not shown) like a vacuum pump through the suction hose (not shown).

The inner wheel of the ball bearing 4 is being fixed to the perimeter edge of the opening of the left fixed cylinder member 203. The left rotating cylindrical member 511 is being fixed to the outer wheel of the ball bearing 4. The left sprocket member 501 is welded on the perimeter side of the left rotating cylindrical member 511. The left suction seal 601 is being fixed to the left rotating cylindrical member 511. The left rotating cylindrical member 511 and the left sprocket member 501 rotate axis-of-rotation PL as a central axis.

The inner wheel of the ball bearing 4 is being fixed to the perimeter edge of the opening of the right fixed cylinder member 204. The right rotating cylindrical member 512 is being fixed to the outer wheel of the ball bearing 4. The right sprocket member 501 is welded on the perimeter side of the right rotating cylindrical member 512.

The right suction seal 602 is being fixed to the right rotating cylindrical member 512. The right rotating cylindrical member 512 and the right sprocket member 502 rotate axis-of-rotation PR as a central axis.

The distance of axis-of-rotation PL and the travel axis line T is the same as the distance of the axis of rotation PR and the travel axis line T.

The left suction seal 601 is made from comparatively flexible materials, such as polyurethane and a synthetic rubber, for example. The annular flange member 603 of the left suction seal is being fixed to the left rotating cylindrical member 511 with 12 bolts. Being described the form of the left suction seal 601, the peripheral end portion of the seal extends from the annular flange member 603 toward the surface 1 and also extends in the direction away from the axis-of-rotation PL, and the peripheral end portion of the seal contacts to the surface 1.

That is, the form of the whole left seal 601 has constituted the shape of a ring of a spread at last.

Being also described the form of the left suction seal 601, when the left suction seal 601 is cut any fields of a field parallel to the surface 1, the form of those cutting planes accomplishes the concentric circle form which has the same central axis. However, the position of the central axis of the seal 601 differs from the position of the axis-of-rotation PL, namely, the axis-of-rotation PL is arranged in the position which decentered from the central axis. The flange member 603 is being fixed to the left rotating cylindrical member 511 in the state of satisfying the above-mentioned conditions. Therefore, the left suction seal 601 carries out eccentricity rotation by setting a central axis as the axis-of-rotation PL.

Being described the form of the perimeter portion of the left suction seal 601 seen from the axis-of-rotation PL, the seal 601 has the furthest perimeter portion arranged in a position distant from the axis-of-rotation PL and the nearest perimeter portion arranged in a position distant from the axis-of-rotation PL.

The left suction seal 601, the left rotating cylindrical member 511, the ball bearing 4, the left fixed cylindrical member 203, the main member 201, the square-box-shaped member 202, and the suction hose connector 301 collaborated with the surface 1, and have specified the decompressed area 21.

The right suction seal 602 is made from comparatively flexible materials, such as polyurethane and a synthetic rubber, for example. The annular flange member 604 of the right suction seal is being fixed to the right rotating cylindrical member 511 with 12 bolts.

Being described the form of the right suction seal 602, the peripheral end portion of the seal extends from the annular flange member 604 toward the surface 1 and also extends in the direction away from the axis-of-rotation PL, and the peripheral end portion of the seal contacts to the surface 1.

That is, the form of the whole right seal 602 has constituted the shape of a ring of a spread at last.

Being also described the form of the right suction seal 602, when the right suction seal 602 is cut any fields of a field parallel to the surface 1, the form of those cutting planes accomplishes the concentric circle form which has the same central axis. However, the position of the central axis of the seal 602 differs from the position of the axis-of-rotation PL, namely, the axis-of-rotation PL is arranged in the position which decentered from the central axis. The flange member 604 is being fixed to the right rotating cylindrical member 511 in the state of satisfying the above-mentioned conditions. Therefore, the right suction seal 602 carries out eccentricity rotation by setting a central axis as the axis-of-rotation PL.

Being described the form of the perimeter portion of the right suction seal 602 seen from the axis-of-rotation PL, the seal 602 has the furthest perimeter portion arranged in a position distant from the axis-of-rotation PL and the nearest perimeter portion arranged in a position distant from the axis-of-rotation PL.

The right suction seal 602, the right rotating cylindrical member 512, the ball bearing 4, the right fixed cylindrical member 204, the main member 201, the square-box-shaped member 202, and the suction hose connector 301 collaborated with the surface 1, and have specified the decompressed area 21.

The geared air motor 8 which rotates the left suction seal 601 and the right suction seal 602 is being fixed to the main member 201 of the main casing.

The geared air motor 8 has two output shafts reversed mutually.

The geared air motor 8 is constituted by the following parts;

the gear casing 800, the air motor 805, the right output shaft 804 held with the ball bearing 806 and connected to the output shaft of the air motor 805, the left output shaft 803 held with the ball bearing 806, one pair of the gear 801 and 802 which rotate the left output shaft 803 and the right output shaft 804 of each other to a counter direction, the left sprocket 901 fixed to the left output shaft 803 and the right sprocket 902 fixed to the right output shaft 804.

The left sprocket 901 and the left sprocket member 501 are connected by the left roller chain 101, and the right sprocket 902 and the right sprocket member 502 are connected by the right roller chain 102. Therefore, the left suction seal 601 and the right suction seal 602 carry out synchronous rotation to a counter direction mutually.

The correlation of the phase of the left suction seal 601 and the phase of the right suction seal 602 is described below with reference to FIG. 7.

First, initial setting is performed as follows about the correlation phase of two suction seals;

The initial setting shows the first condition of the correlation phase of two suction seals. In that condition, the furthest perimeter portion FR of the right suction seal 602 is arranged in a position distant from the axis-of-rotation PL, and the nearest perimeter portion NL of the left suction seal 601 is arranged in a position of the opposite side distant from the axis-of-rotation PL as shown the point PL and the point PR on the line which connects the point PL and the point PR in FIG. 7.

In that first condition, the left sprocket 901 and the left sprocket member 501 are to be connected by the left roller chain 101, and the right sprocket 902 and the right sprocket member 502 are to be connected by the right roller chain 102.

Thus, the left suction seal 601 and the right suction seal 602 perform eccentricity rotational movement continuously, without contacting mutually.

The peripheral end portion of the left suction seal 601 and the right suction seal 602 is equipped with the material for cleaning the surfaces 1, such as the polish member, the brush member, and the fiber member, through the Velcro tape 606 etc. which are the adhesion means of one-touch.

In the two openings 205 of the main member 201, i.e., in the symmetrical position which sets the travel axis T as the central axis, the drive wheel 11 of one right and left each is arranged.

Each drive wheel 11 is held through the ball bearing 111 with the fixed axis 12.

The fixed axis 12 is held with the brackets 121 and 122.

The brackets 121 and 122 are being fixed to the main member 201 with the bolts and the nuts.

The each side of both right side and left side of the square-box-shaped member 202 is equipped with the geared motor 14 which has two output shaft.

Each of the sprockets 15 is being fixed to each of the output shafts of the geared motor 14 of which output shafts are arranged inside the square-box-shaped member 202.

Figure 2:
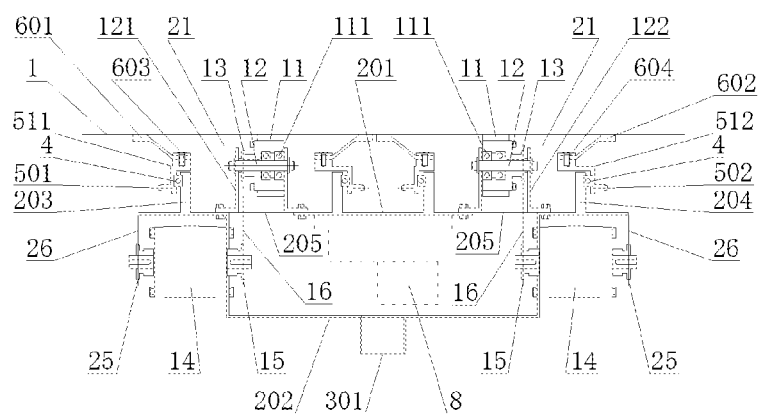
FIG. 2 is a sectional view along the line A-A of the device shown in FIG. 1.
Figure 3:
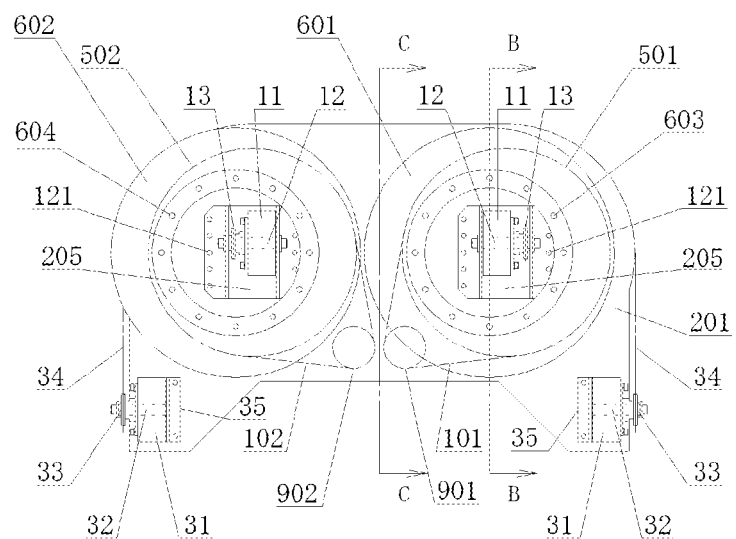
FIG. 3 is a back view of the device shown in FIG. 1 that is seen from the surface of an object.
Figure 4:
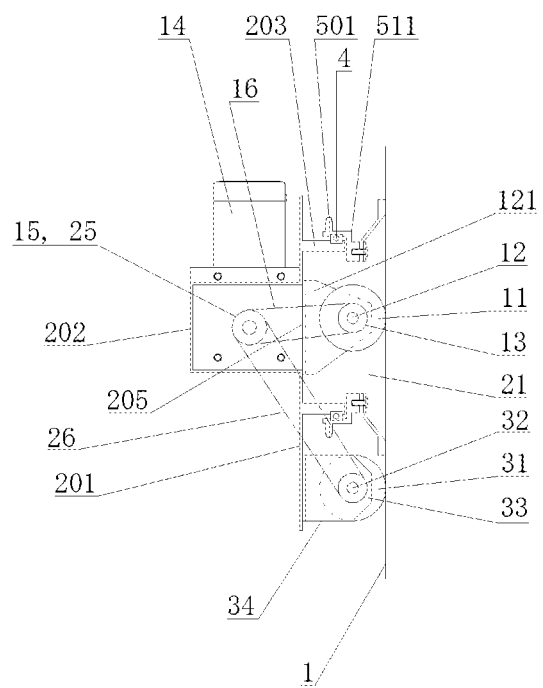
FIG. 4 is a section view alone the line B-B of the device shown in FIG. 3.
Figure 5:
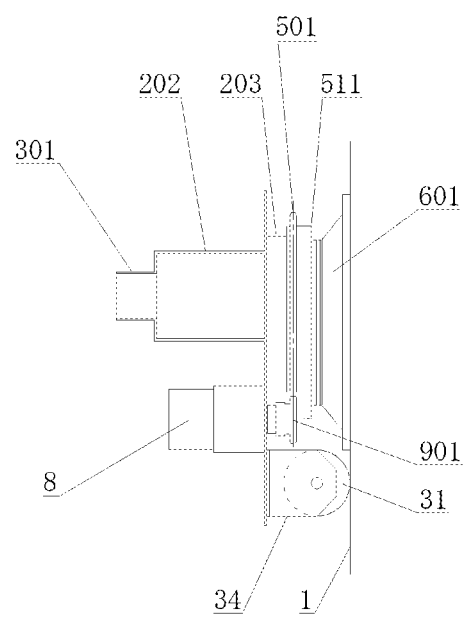
FIG. 5 is a section view along the line C-C of the device shown in FIG. 3.
Figure 6:
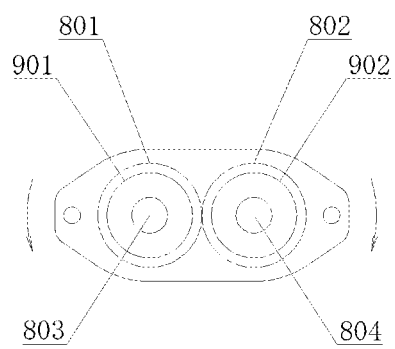
FIG. 6 is a top view and a side section view of the geared air motor 8 which has two output shafts of which rotate to the counter direction mutually.
Figure 6:
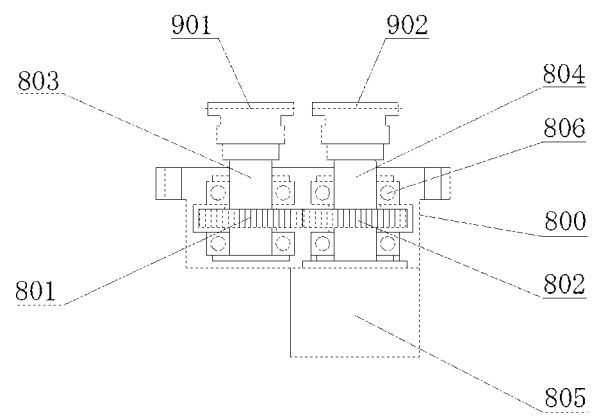

The left drive wheel 11 is rotated through the roller chain 16 by the left geared motor 14, and rotates the right drive wheel 11 through the roller chain 16 by the right geared motor 14 as shown in FIG. 2.

In the each side of both lower right side and lower left side of the main member 201, i.e., in the symmetrical position which sets the travel axis T as the central axis, the drive wheel 31 of one right and left each is arranged.

Each drive wheel 31 is held through the ball bearing with the fixed axis 32.

The fixed axis 32 is held with the brackets 35.

The brackets 35 are being fixed to the main member 201 with the bolts and the nuts. Each of the sprockets 33 is being fixed to each of the drive wheels 31.

The each side of both right side and left side of the square-box-shaped member 202 is equipped with the geared motor 14 which has two output shaft.

Each of the sprockets 25 is being fixed to each of the output shafts of the geared motor 14 of which output shafts are arranged outside the square-box-shaped member 202.

The left drive wheel 31 is rotated through the roller chain 34 by the left geared motor 14, and rotates the right drive wheel 31 through the roller chain 34 by the right geared motor 14 as shown in FIG. 1.

Figure 7:
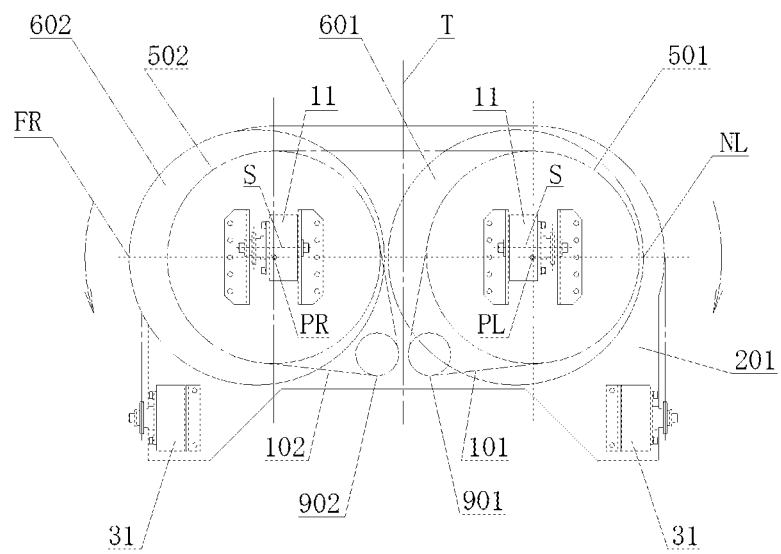
FIG. 7 is the figure showing the correlation phases of two suction seals of the device shown in FIG. 3.

In FIG. 7, S shows each axis of rotation of the two drive wheels 11. Two each of S is arranged up from the axes of rotation PL and PR of the suction seals. In FIG. 7, if two each of S is arranged in the same position as the axes of rotation PL and PR of a seal, being caused by that two suction seals are arranged in a position at up-and-down symmetry by setting the line which connects the point PR to point PL as the central axis, all of the adhering power acts only on the two drive wheels 11.

However, if two each of S is arranged up from the axes of rotation PL and PR of the suction seals, the adhering power of the suction seals act also on the two drive wheels 31 in addition to the two drive wheels 11.

Actions and effects of the device of the preferred embodiment example of this invention described above are explained below.

When the pressure reduction means (not shown) is energized, a fluid such as the air inside the decompressed area 21 is discharged to the outside through the suction hose (not shown), and as a result, the decompressed area 21 is reduced in pressure as desired. Once the decompressed area 21 is thus reduced in pressure, the pressure of an ambient fluid such as the air, acting on the main casing 201, owing to the difference in fluid pressure between the inside and outside of the decompressed area 21, is transmitted to the surface of an object 1 via the drive wheels 11. In this manner, the device of the present invention is caused to suction-adhere to the surface 1 by the pressure of the ambient fluid. The pressure of the ambient fluid presses the peripheral end portion of the suction seal member 601 and 602 to the surface 1, thereby preventing the ambient fluid from flowing into the decompressed area 21 as much as possible.

In FIG. 1, in the state where the device is adhering to the surface 1, when the geared motor 14 is operated and the drive wheels 11 and 31 are rotated in the same direction, the device travels straight along the surface 1.

When the left drive wheels 11 and 31 and the right drive wheels 11 and 31 rotate to an opposite direction, the device spins round.

In FIG. 1 and FIG. 7, when the geared air motor 8 is rotated while the device is adhering to the surface 1, the left seal 601 and the right seal 602 carries out eccentricity rotation in the direction of an arrow of a counter direction mutually.

At this time, the material such as the polish member with which the peripheral end portions of the left seal 601 and the right seal 602 are equipped, rotates contacting the surface 1, and the surface 1 is cleaned by action of this cleaning material.

Furthermore, external fluid flows into the decompressed area 21 through few crevices between the cleaning materials and the surface 1.

Therefore, suction recovery of the particulates generated at the time of cleaning is carried out by the flow of this fluid toward the decompressed area 21.

Figure 8:
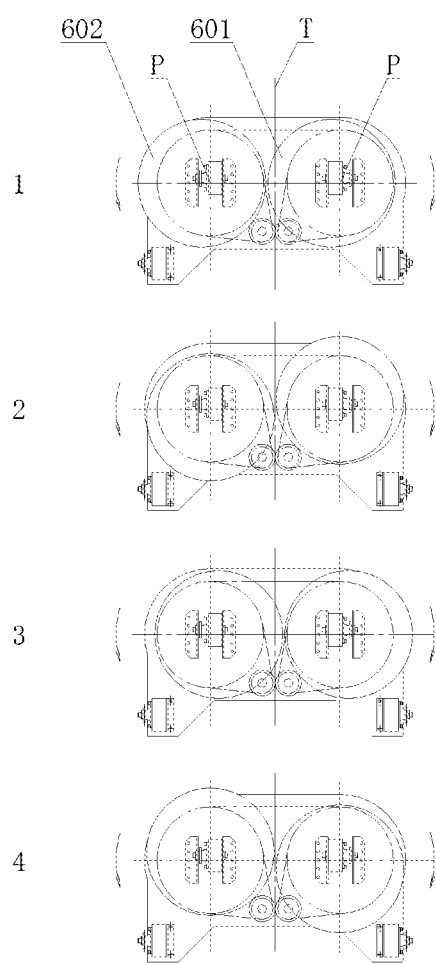
FIG. 8 is the figure showing the state where the correlation phases of two seals of the device shown in FIG. 3 changes with progress of time.

FIG. 8 shows the correlation phase of the time series of the two suction seals shown in FIG. 7 using four figures.

In 1 of FIG. 8, the center of gravity of the adhering power which acts on the left seal member 601, It is in the intermediate position of the axis of rotation S and the drive wheel 31, but in the position close to the axis of rotation S, on the other hand, the center of gravity of the adhering power which acts on the right seal member 602 is also in the intermediate position of the axis of rotation S and the drive wheel 31, but in the position close to the axis of rotation S, and adhering power is always acting on the two drive wheels 31 in this way.

Since the two drive wheels 31 are always stuck to the surface 1, the adhering and the traveling stable along the surface 1 are possible for the device.

In 2 of FIG. 8, it is unstable of the adhering and the traveling of the device since the center of gravity of the adhering power which acts on the left seal member 601 is up a little from the axis of rotation S.

On the other hand, it is very stable of the adhering and the traveling of the device since the center of gravity of the adhering power which acts on the right seal member 602 is in the intermediate position of the axis of rotation S and the drive wheel 31, but in the position closer to the axis of rotation S than the position shown in 1 of FIG. 8.

Accordingly, the adhering and the traveling of the whole device along the surface 1 is stable because of the following reason in spite that it is unstable of the adhering and the traveling of the device since the center of gravity of the adhering power which acts on the left seal member 601 is up a little from the axis of rotation S.

That is, it is possible for the device to adhere to and travel stably along the surface because the two drive wheels 31 are always stuck to the surface 1, the state of that is caused by the phenomenon that the adhering power which acts on the left seal 601, and the adhering power which acts on the right seal 602 are hung, and suits.

In 3 of FIG. 8, it is possible for the device to adhere to and travel stably along the surface because the two drive wheels 31 are always stuck to the surface 1 because of the same reason as shown in 1 of FIG. 8.

In 4 of FIG. 8, it is possible for the device to adhere to and travel stably along the surface because the two drive wheels 31 are always stuck to the surface 1 because of the same reason as shown in 2 of FIG. 8.

As the above conclusion, in the preferred embodiment of the device configured according to the present invention illustrated from FIG. 1 through FIG. 8, even if the surface 1 is the surface of a wall, the adhering to and traveling stably along the surface 1 is possible for the device.

Effects of the preferred embodiments of the present invention described above and illustrated in FIG. 1 through FIG. 8 will be explained below.

Being caused by that the rotating negative-pressure suction seals arranged toward the traveling direction at the right and left of the traveling axis line and that the inside of each negative-pressure suction seals is equipped with the wheel to drive;
even if each seal rotates, the reaction does not affect the whole device. That is, even if each seal rotates, the power in which it rotates the whole device does not occur at all. Accordingly, the straight travel function of the device is not obstructed when the device travels along the surface of the structures.

Being caused by that the distance of the traveling axis line and the rotation axis line of one negative-pressure suction seal is equal to the distance of the traveling axis line and the rotation axis line of another negative-pressure suction seal, and that the furthest perimeter part from the rotation axis and the nearest perimeter part from the rotation axis are formed in each negative-pressure suction seal;
two seals, left-hand side and right-hand side, perform the contact action to all of the fields on the surface between one seal and another seal.

Therefore, "cleaning unevenness" does not occur.

Being caused by that the inside of each negative-pressure suction seals is equipped with the wheel to drive;
in the contrast of a size with the seal and the drive wheel, the seal is small as much as possible, and it can manufacture the drive wheel as large as possible. Therefore, lightweight and small device becomes realizable. Furthermore, since the device possesses the large drive wheel even if the big projection of a weld line etc. exists in the surface, the device can overcome the projection easily.

The center of gravity of the adhering power which acts on the seal exists in each seal. Being caused by that the seals have the opposite direction of rotation;
in the rotation phase of each seal, even if each seal is in any phase, the position of the center of gravity of two adhering power will be in the state where balance is maintained mutually. Therefore, the stable traveling and adhering is possible for the device.

Being caused by that the drive wheel is arranged in the position which kept away from the external drive wheel or the external free wheel as much as possible, the stable traveling and adhering is possible for the device.

The second preferred embodiment of the present invention will be described below, referring to the FIG. 9 and FIG. 10.

The difference between the first preferred embodiment of the present invention and the second preferred embodiment of the present invention will be described below.

In the device of the first preferred embodiment, the left seal 601 and the right seal 602 carries out eccentricity rotation of a counter direction mutually.

In the device of the second preferred embodiment, being caused by the action of one roller chain 10 hung from the left sprocket component 501, the right sprocket component 502, and the sprocket 9 which is equipped with the single output shaft of the geared air motor, the left seal 601 and the right seal 602 carries out eccentricity rotation of the same direction mutually.

Figure 9:
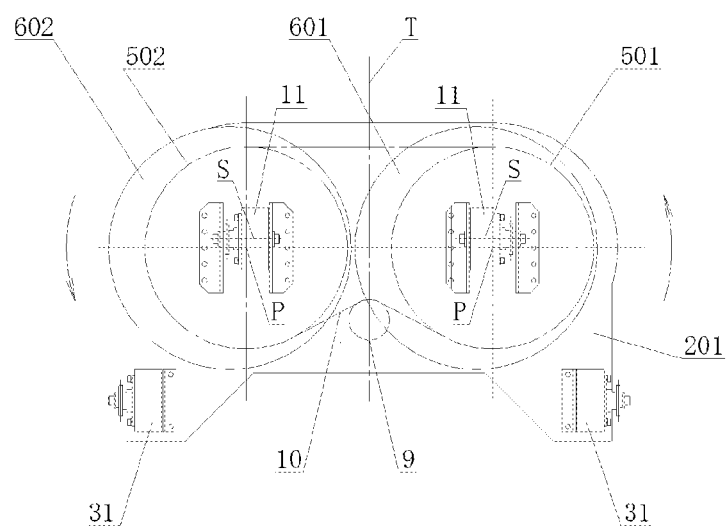
FIG. 9 is the figure of a back view showing the correlation phases of two suction seals of the device of the second preferred embodiment that is seen from the surface of an object.
Figure 10:
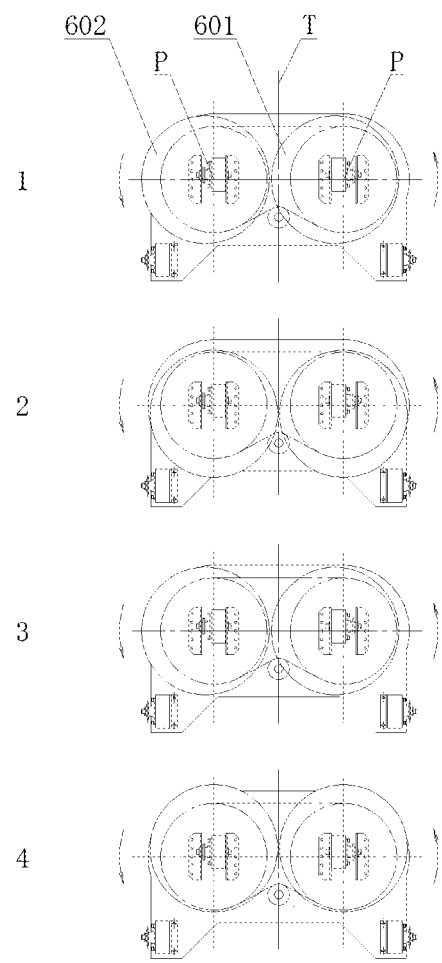
FIG. 10 is the figure showing the state where the correlation phases of two seals of the device shown in FIG. 9 changes with progress of time.

FIG. 10 shows the correlation phase of the time series of the two suction seals shown in FIG. 9 using four figures.

In 1 of FIG. 10, the center of gravity of the adhering power which acts on the left seal member 601, It is in the intermediate position of the axis of rotation S and the drive wheel 31, but in the position close to the axis of rotation S, on the other hand, the center of gravity of the adhering power which acts on the right seal member 602 is also in the intermediate position of the axis of rotation S and the drive wheel 31, but in the position close to the axis of rotation S, and adhering power is always acting on the two drive wheels 31 in this way.

Since the two drive wheels 31 are always stuck to the surface 1, the adhering and the traveling stable along the surface 1 are possible for the device.

In 2 of FIG. 10, it is very stable of the adhering and the traveling of the device since the center of gravity of the adhering power which acts on the left seal member 601 is in the intermediate position of the axis of rotation S and the drive wheel 31, but in the position closer to the axis of rotation S than the position shown in 1 of FIG. 10.

On the other hand, it is very stable of the adhering and the traveling of the device since the center of gravity of the adhering power which acts on the right seal member 602 is in the intermediate position of the axis of rotation S and the drive wheel 31, but in the position closer to the axis of rotation S than the position shown in 1 of FIG. 10.

Accordingly, the adhering to and the traveling of the whole device along the surface 1 is stable because the two drive wheels 31 are always stuck to the surface 1.

In 3 of FIG. 10, it is possible for the device to adhere to and travel stably along the surface because the two drive wheels 31 are always stuck to the surface 1 because of the same reason as shown in 1 of FIG. 10.

In 4 of FIG. 10, it is unstable of the adhering and the traveling of the device since the center of gravity of the adhering power which acts on the left seal member 601 is up a little from the axis of rotation S.

On the other hand, it is unstable of the adhering and the traveling of the device since the center of gravity of the adhering power which acts on the left seal member 602 is up a little from the axis of rotation S.

Accordingly, the adhering and the traveling of the whole device along the surface 1 is unstable because the two drive wheels 31 are always not stuck to the surface 1.

As the above conclusion, in the second preferred embodiment of the device configured according to the present invention illustrated from FIG. 9 and FIG. 10, even if the surface 1 is the surface of a wall, the adhering to and traveling stably along the surface 1 is not possible for the device.

However, in the second preferred embodiment of the device configured according to the present invention illustrated from FIG. 9 and FIG. 10, even if the surface 1 is the surface of a floor, the adhering to and traveling stably along the surface 1 is possible for the device because the two drive wheels 31 are always stuck to the surface 1 caused by the measure which uses weight close to the drive wheels 31 of the device.

Figure 11:
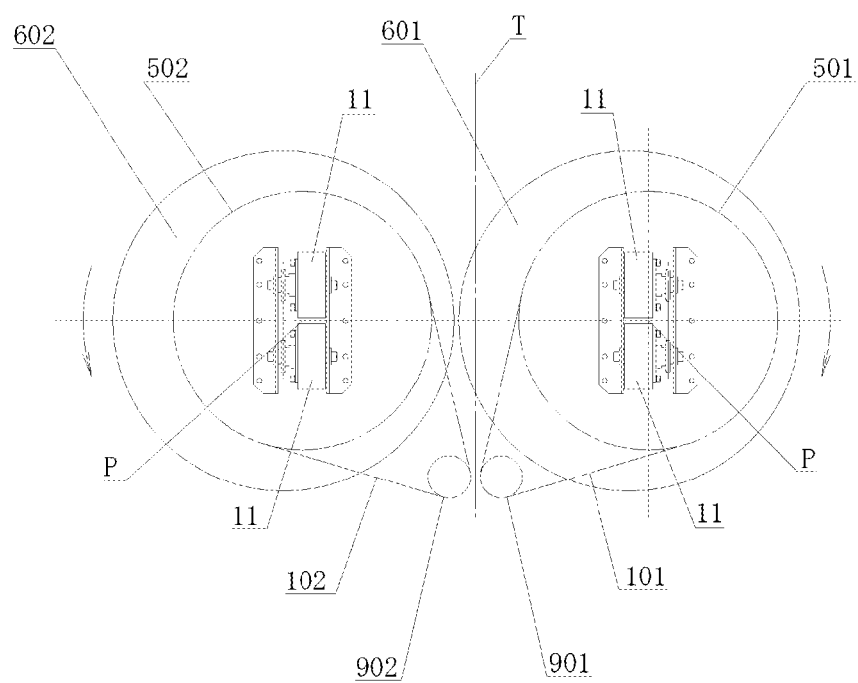
FIG. 11 is the figure of a back view showing the correlation phases of two suction seals of the device of the third preferred embodiment that is seen from the surface of an object.

The third preferred embodiment of the present invention will be described below, referring to the FIG. 11.

The difference between the first preferred embodiment of the present invention and the third preferred embodiment of the present invention will be described below.

In the device of the first preferred embodiment, the drive wheel 11 of one right and left each is arranged in the symmetrical position which sets the travel axis T as the central axis.

In the device of the third preferred embodiment, the two drive wheels 11 of right and left each are arranged in the symmetrical position which sets the travel axis T as the central axis.

Therefore, the more stable adhering to and traveling along the surface is possible for the device of the third preferred embodiment as compared with the device of the first preferred embodiment or the device of the second preferred embodiment.

In the device of the first preferred embodiment and the second preferred embodiment, being caused by that the inside of each negative-pressure suction seals is equipped with the wheel to drive, the devices have the following merit.

That is, in the contrast of a size with the seal and the drive wheel, the seal is small as much as possible, and it can manufacture the drive wheel as large as possible. Therefore, lightweight and small device becomes realizable. Furthermore, since the device possesses the large drive wheel even if the big projection of a weld line etc. exists in the surface, the device can overcome the projection easily.

However, the device of the third preferred embodiment has not the merit above.

As for the shape of the suction seals which are equipped with the device of the first, the second and the third preferred embodiments of the present invention described above, the section shape of the suction seal has the concentric circle shape which has the same central axis when the suction seal is cut by any two-dimensional space parallel to the surface. However, it is not necessary for the present invention that the section shape of the suction seal has the concentric circle shape which has the same central axis. For example, the section shape of the suction seal may have the concentric ellipse shape or the concentric polygon shape like the concentric square shape.

This invention relates to the traveling device equipped with dual, rotating, negative-pressure suction seals described above. However, this invention can be constructed by the plural devices of the traveling device equipped with dual, rotating, negative-pressure suction seals.

The preferred embodiments of the present invention are described in the above, however it is possible to conceive the other various embodiments based on the scope of the claims.

The descriptions in the above of the preferred embodiments of the present invention assumed that the device of the present invention existed in the atmosphere, but the device of the present invention may be applied underwater.

In this case, a water pump or a water ejector can be used as a pressure reducing means instead of the vacuum pump.

The traveling device equipped with dual, rotating, negative-pressure suction seals described above can be used conveniently in the wide range fields such as the cleaning device with which the suction recovery function is equipped.

The device can adhere to by suction and travel along the surface of the structures and can remove foreign substances, such as rust, deteriorated coating and aquatic organisms, and can carry out suction recovery of the removed foreign substance.

REFERENCE NUMERALS OR MARKES

T: travel axis;
PL: axes of rotation;
PR: axes of rotation;
S: axis of rotation;
1: surface;
201: main member;
202: square-box-shaped member;
203: left fixed cylindrical member;
204: right fixed cylinder member;
121: bracket;
122: bracket;
301: suction hose connector;
4: ball bearing;
601: left suction seal;
602: right suction seal;
511: left rotating cylindrical member;
512: right rotating cylindrical member;
601: left suction seal;
603: flange member;
604: annular flange member;
8: geared air motor;
800: gear casing;
801: gear;
802: gear;
803: left output shaft;
804: right output shaft;
901: left sprocket;
902: right sprocket;
101: left roller chain;
102: right roller chain;
11: the drive wheel;
111: ball bearing;
12: fixed axis;
13: sprocket;
14: geared motor;
15: sprocket;
16: roller chain;
21: decompressed area;
25: sprocket;
31: drive wheel;
32: fixed axis;
33: sprocket;
34: roller chain;

What is claimed is:
1. Traveling device comprising:
a main casing;
a left suction seal disposed on a left side of the main casing;
a right suction seal disposed on a right side of the main casing;
a left drive wheel disposed in the left suction seal for moving the main casing in a traveling direction; and
a right drive wheel disposed in the right suction seal for moving the main casing in the traveling direction,
wherein said main casing has a traveling axis line at a center thereof in parallel to the traveling direction;

said left and right suction seals are driven to rotate around rotation axes thereof so that the rotation axes are substantially symmetrically arranged on right and left sides of the traveling axis line;

said left suction seal is arranged so that the rotation axis thereof is away from the traveling axis line by a distance equal to a distance between the rotation axis of the right suction seal and the traveling axis line;

each of said left and right suction seals is formed in a shape so that a furthest perimeter edge thereof is away from the rotation axis by a distance greater than a distance between a nearest perimeter edge thereof and the rotation axis; and said left and right drive wheels are situated on the rotation axes.

2. Traveling device described in claim 1, wherein said left and right suction seals synchronize and rotate so that distance between the furthest perimeter edge of the left suction seal and the traveling axis line becomes maximum when a distance between the furthest perimeter edge of the right suction seal and the traveling axis line is maximum.

3. Traveling device described in claim 2, wherein said left and right suction seals are configured to rotate in opposite directions.

4. Traveling device described in claim 2, wherein said left and right suction seals are configured to rotate in a same direction.

5. Traveling device described in claim 1, further comprising an outside drive wheel, disposed outside of the left and right suction seal, wherein said outside drive wheel is configured to rotate in a direction the same as that of the left and right drive wheel.

6. Traveling device described in claim 1, further comprising an outside free wheel disposed outside of the left and right suction seal, wherein said outside drive wheel is configured to rotate freely.

7. Traveling device described in claim 1, wherein each left and right drive wheels includes two or more drive wheels.

8. Traveling device described in claim 1, wherein said left suction seal and said right suction seal are attached to the main casing so that the rotational axes are substantially perpendicular to a surface on which the traveling device moves.

9. Traveling device described in claim 1, further comprising a left sprocket disposed outside the left suction seal and a left roller chain connecting the left sprocket and the left suction seal, and a right sprocket disposed outside the right suction seal and a right roller chain connecting the right sprocket and the right suction seal.

* * * * *